US005245393A

United States Patent [19]

Storlie et al.

[11] Patent Number: 5,245,393

[45] Date of Patent: Sep. 14, 1993

[54] FUSER METHOD AND APPARATUS FOR REDUCING MEDIA CURL IN ELECTROPHOTOGRAPHIC PRINTERS

[75] Inventors: Chris A. Storlie; Richard F. Beaufort, both of Boise, Id.

[73] Assignee: Hewlett-Packard Company, Palo Alto, Calif.

[21] Appl. No.: 758,011

[22] Filed: Sep. 12, 1991

[51] Int. Cl.[5] .............................................. G03B 15/06

[52] U.S. Cl. .................................... 355/290; 355/282; 355/285; 219/469

[58] Field of Search ............... 355/282, 285, 289, 290, 355/294, 295; 118/60; 219/216, 469; 430/60

[56] References Cited

U.S. PATENT DOCUMENTS

| | | | |
|---|---|---|---|
| 4,922,304 | 5/1990 | Gilbert et al. | 355/282 |
| 4,966,464 | 10/1990 | Matoushek | 355/282 X |

*Primary Examiner*—A. T. Grimley
*Assistant Examiner*—P. J. Stanzione

[57] ABSTRACT

A combination fusing and media direction control method and apparatus wherein a fuser roller is positioned adjacent to a pair of idler pressure rollers located at predetermined locations adjacent to the surface of the motor driven fuser roller which is operative to receive printed media from a photo-conductive drum within a printer housing. The printed media enters a location between the surface of the fuser roller and one of the idler pressure rollers where it then traverses an approximately 90° contoured path around approximately one-quarter (¼) of the surface area of the fuser roller where it then exits the fuser roller at the intersection of the fuser roller and the second idler pressure roller. From this point, the direction of media travel is maintained substantially in a horizontal direction until the time the media comes to rest in an output paper collection tray of the printer. A deflection baffle member is provided adjacent the location of the fuser roller and the second idler pressure roller to provide a slight vertical deflection of the fused media so as to maintain its direction of travel into the output paper collection tray substantially flat or horizontal, thereby maintaining the media in the substantially flat or horizontal position over the entire length of the time that the fused paper is being cooled after leaving the fuser roller. This operation in turn serves to minimize and substantially eliminate curl otherwise introduced into the printed media. In alternative embodiments of the invention, the above described media guide control is accomplished by the use of either a contoured drive belt or a contoured deflector plate used in combination with a single idler pressure roller.

8 Claims, 3 Drawing Sheets

FUSER METHOD AND APPARATUS FOR REDUCING MEDIA CURL IN ELECTROPHOTOGRAPHIC PRINTERS

TECHNICAL FIELD

This invention relates generally to electrophotographic printing and more particularly to an improved fuser system for use in the output paper path of a desk top type electrophotographic printer. This arrangement is useful to reduce or substantially eliminate the curl hitherto produced by fuser systems used in these printers.

BACKGROUND ART

In the field of electrophotographic printing, also known in the art as laser jet printing, it has been one common practice for several years now to pass the printed media, such as paper or transparencies with the just-printed text or graphics thereon, between a fuser roller and an idler pressure roller to burn-in or fuse-in the text or graphics on the media and thereby eliminate the possibility of smearing the media and thus enhance the overall permanent nature of the generated document. Examples of these types of fuser systems may be found in U.S. Pat. No. 4,475,896 issued to Bains and U.S. Pat. No. 4,505,695 issued to Billings, both incorporated herein by reference.

In the prior art construction of small desk top type electrophotographic printers, it has further been a common practice to route the fused media along a paper path which extends from the fuser roller normally located near the backside of the printer and into an output paper tray located adjacent the front side of the printer. In conventional operation of these printers, the output documents are stacked face down in the output paper tray. The paper path routing arrangement for controlling the flow of paper motion would normally include a pair of guide rollers positioned in the paper path and located somewhere between the fuser roller and the output paper tray and operative to direct and drive the paper along its contoured path sometimes approaching 180° from the location of the fuser roller to the output paper tray.

A problem that arises using the above configuration and design for media fusing and media motion control results from the fact that the fused media leaving the fuser roller is cooling while it passes along the contoured path. During this cooling period, the paper is susceptible to retaining the contour of the paper path to which it is subjected. The net result of this operation is the production of an undesirable curl in the printed media to the detriment of subsequent paper stacking, paper copying, and other forms of paper handling once the paper reaches the output paper tray. It is the solution to this latter problem to which the present invention is directed.

DISCLOSURE OF INVENTION

The general purpose and principal object of the present invention is to provide a new and improved method and apparatus operative within an electrophotographic printer housing and useful for reducing curl in the electrophotographic printed media stacked in an output paper tray.

Another object of this invention is to provide a new and improved method and apparatus of the type described which is economical in construction, reliable in operation and which requires a minimum number of fuser, roller, and other associated components for simultaneously controlling both paper fusing and paper motion and direction of travel within the printer.

To accomplish this purpose and objects, we have discovered and developed a novel combination fuser and media direction control method and apparatus which includes, in combination, a heated fuser roller defining one side of a media path for the printed media and being operatively driven about an axis of rotation located at the center of an X-Y horizontal and vertical coordinate axis. A first idler pressure roller is positioned adjacent to the fuser roller and is located substantially on the X horizontal axis and operatively driven by the fuser roller to move the printed media vertically within the printer housing. A second idler pressure roller is positioned substantially on the vertical or Y coordinate axis and immediately adjacent to the upper surface of the fuser roller and also is operatively driven by the fuser roller to move the printed media around the top of the fuser roller and into a substantially horizontal plane and toward an output paper tray for the printer.

A suitable deflection means such as a deflection baffle is positioned closely adjacent to the output of the second idler pressure roller and the fuser roller to slightly deflect the paper upwardly and maintain the paper moving in a substantially horizontal plane, with the net result being that the direction of paper motion travel is transferred to a horizontal plane as quickly as is possible after the fusing step. Thus, the paper is moving in substantially a horizontal direction toward the output paper tray over a maximum percentage of the critical time that the paper is being cooled after leaving the fuser roller. In this manner, the amount of curl introduced into the paper is either eliminated or substantially reduced, depending upon the particular type of media being handled.

In accordance with the novel method described herein, the just-printed media leaving the intersection of the photoconductive drum and a transfer roller within the electrophotographic printer housing is passed upwardly or in a vertical direction to a side location on a fuser roller where the text or graphics are fused into the printed media. Then, the direction of media travel is changed from a Y vertical direction toward and then to an orthogonal X horizontal direction and then deflected in a slightly vertical motion after leaving the surface of the fuser roller. Thereafter, the fused media is continuously passed in a substantially X or horizontal direction of travel to an output paper tray of the printer.

Among the novel features of this invention are included alternative embodiments which employ either a drive belt or a combination idler roller/deflector plate, respectively, which both operate to guide the fused media over a contoured path extending over approximately one-fourth (¼) of the surface area of a heated fuser roller. In both of these alternative embodiments, the media leaving the fuser roller travels in a substantially horizontal direction into an output paper tray, thereby minimizing the amount of curl which is introduced into the media while cooling.

The above brief summary of the invention, together with its novel features and attendant advantages, will become better understood with reference to the following description of the accompanying drawings.

DETAILED DESCRIPTION OF THE DRAWINGS

Figure 1:
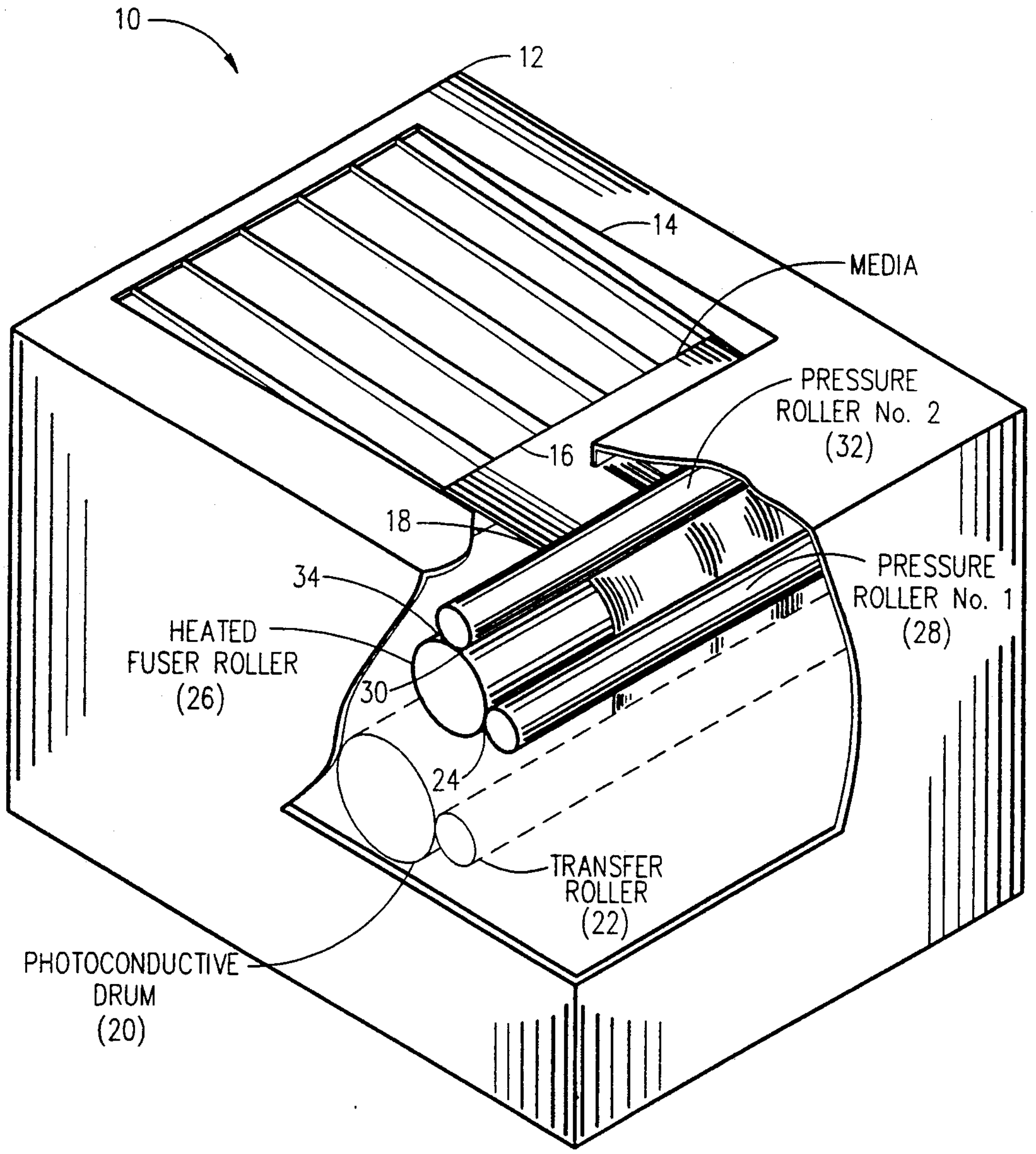
FIG. 1 is a cut away isometric view of an electrophotographic printer housing and illustrating the paper motion control and fusing techniques in accordance with the present invention.

Referring now to FIG. 1, there is shown an electrophotographic printer designated generally as 10 and including a printer housing 12 having an output paper tray 14 therein for receiving sheets of printed media 16 which exit the output media feed port 18. These types of electrophotographic printers 10 will typically include, among other components, an organic photoconductor drum 20 positioned as shown adjacent to a suitable transfer roller 22 so that the paper 16, or other equivalent printed media such as overhead transparencies, pass between the two abutting surfaces of the photoconductive drum 20 and the transfer roller 22 at which time the image is transferred to the paper 16 in a manner well known to those skilled in the art.

The paper leaving the surface of the photoconductive drum 20 and the transfer roller 22 is guided by a suitable paper guide means (not shown) to point of intersection 24 where a motor driven fuser roller 26 abuts the adjoining surface of a first idler pressure roller 28 and defining a vertical or Y coordinate direction as described herein. During operation, the fuser roller will be heated by an interior quartz lamp to an elevated temperature on the order of about 160° C. The paper 16 leaving the intersection of the fuser roller 26 and the first idler pressure roller 28 then begins to change its direction of travel by moving around the surface of the fuser roller 26 and then guided into the intersection 30 of the fuser roller 26 and a second idler pressure roller 32. Upon leaving the output 34 of the fuser roller 26 and the second idler pressure roller 32, the paper 16 will have a tendency to move in a downwardly direction due to a combination of the curvature of the heated roller and the force of gravity. To compensate for this effect, the paper 16 is deflected slightly upwardly by a deflection baffle member 36 shown in more detail in FIG. 2 herein, but located beneath the paper 16 in FIG. 1. The deflection baffle 36 will typically be formed of a glass filled plastic, and the operation for this movement has the effect of maintaining the direction of paper motion at the output 18 of the printer 10 in a substantially horizontal or X coordinate direction of travel as it passes toward and then into the output paper tray 14 of the electrophotographic printer 10.

The above combination of fusing and paper direction control by the combination of the fuser roller 26 and the first and second idler pressure rollers 28 and 32 operates to ensure that the motion of paper travel is in substantially a horizontal direction over a maximum percentage of the period of time that the paper is being cooled after leaving the fuser roller 26. Thus, by ensuring that media cooling takes place exclusively when the media is flat or substantially flat, the amount of curl introduced into the media can be substantially reduced and almost totally eliminated with some types of printed media.

Figure 2:
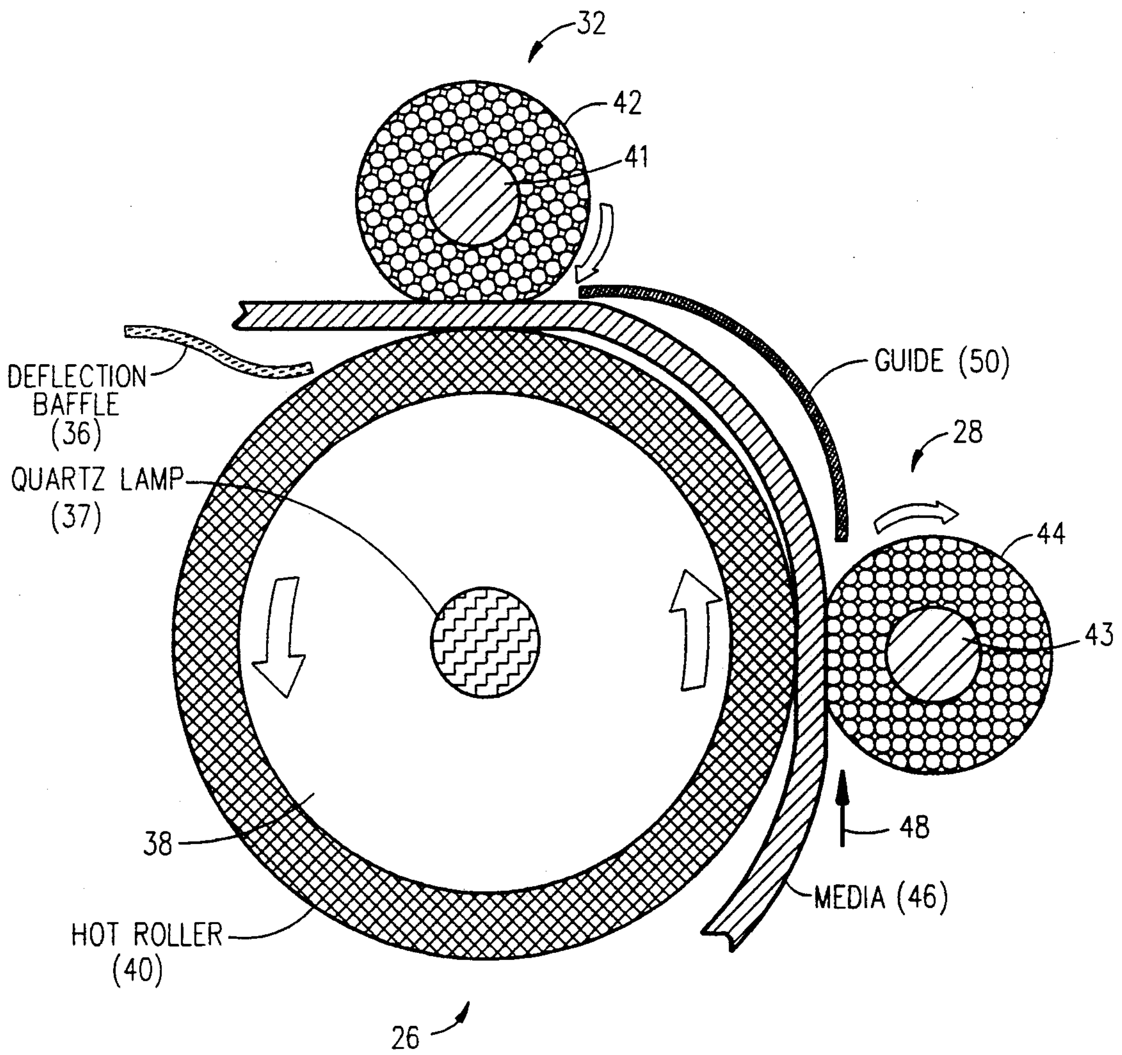
FIG. 2 is a cross section view of the fuser roller, the two idler pressure rollers and the deflection baffle of the paper drive system shown in FIG. 1.

Referring now to FIG. 2, there is shown an enlarged cross-sectional view of the fuser roller 26 and the first and second idler pressure rollers 28 and 32 described above. The fuser roller 26 includes a quartz lamp 37 mounted at the central axis thereof, and there is an open space 38 between the quartz lamp 37 and an outer cylindrical aluminum roller member 40 having a Teflon coating thereon. The idler pressure rollers 32 and 28 each include a central rotational shaft 41 and 43, respectively, and these shafts are coated with a deformable silicone rubber indicated at 42 and 44. The media 46 will traverse a path upwardly in the direction of the arrow 48 and around the curvature of a guide member 50. Here it changes from the Y vertical direction to the X horizontal direction, and then it passes through the interface of the second idler pressure roller 42 and the outer surface 40 of the fuser roller and then on to the top surface of the deflection baffle 36 as previously described.

Figure 3A:
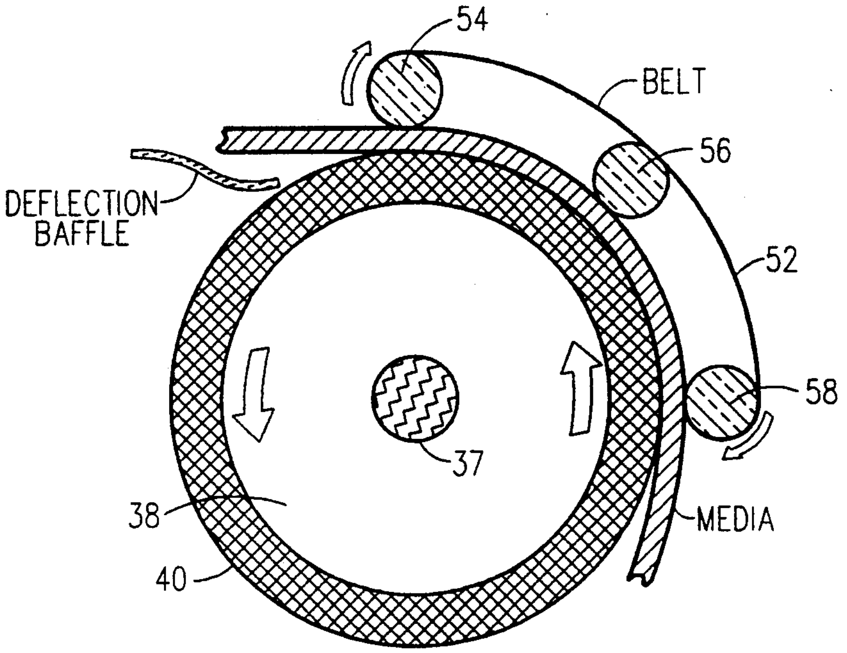
FIGS. 3A and 3B are fragmented isometric views showing two alternative embodiments of the invention for changing the direction of paper motion approximately 90° from the time the paper makes initial contact with the fuser roller until the time the paper exits the fuser roller.
Figure 3B:
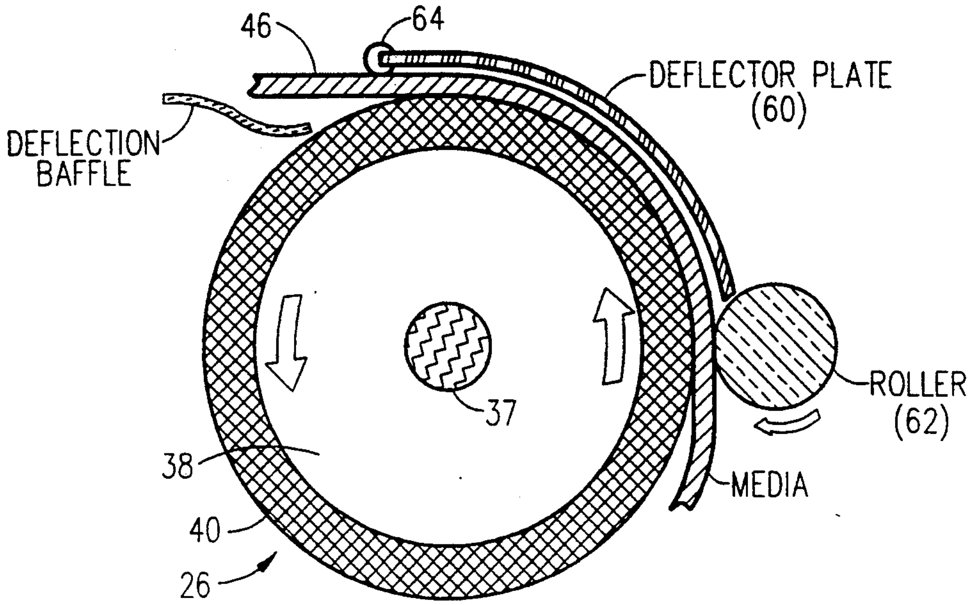

Referring now to FIGS. 3A and 3B, there are shown in these figures two alternative embodiments of the invention. In FIG. 3A, a belt 52 is operatively driven around three rollers 54, 56, and 58 and it conforms to the surface of the media 46 to produce the similar orthogonal vertical to horizontal change of paper direction as previously described with respect to FIGS. 1 and 2 above.

Alternatively, as shown in FIG. 3B, a curved deflection plate 60 may be employed instead of the previous arrangements. The deflection plate 60 extends from a single idler pressure roller 62 located on the right hand side of the fuser roller 26 and in the contour shown so as to guide the paper 46 in the direction shown in FIG. 3B where it passes beneath the surface of a small guide roller 64 before reaching the deflection baffle as previously described.

Various modifications may be made in and to the above described embodiments without departing from the spirit and scope of this invention. For example, an obvious extension of the present invention would be an application in which the paper deflection, while in contact with the fuser system, would be either more or less than the exact 90° deflection outlined above. Similarly, other paper curvature controlling apparatus other than those shown specifically above with the fuser roller 26 may be used in various combinations and designs within the scope of the following appended claims.

We claim:

1. An apparatus operative within an electrophotographic printer housing and useful for reducing curl in electrophotographically printed media, including, in combination:

a. a heated fuser roller defining one side of a media transport path within said printer housing and being operatively driven about an axis of rotation located at the center of X-Y horizontal and vertical coordinate axes, b. a first pressure roller positioned adjacent to said fuser roller substantially on said X horizontal axis and being operatively driven by said fuser roller to drive said printed media vertically within said printer housing, and c. a second pressure roller positioned substantially on said vertical or Y coordinate axis and operation to drive said printed media in a horizontal direction and toward and subsequently into an output paper tray of said printer housing.

2. The apparatus defined in claim 1 which further includes deflection means positioned adjacent to the intersection of said fuser roller and said second pressure roller for providing a slight vertical deflection of printed media passing toward said output paper tray.

3. An apparatus operative within an electrophotographic printer housing and useful for reducing curl in electrophotographically printed media, including, in combination:

a. a heated fuser roller defining one side of a media transport path within said printer housing and being operatively driven about an axis of rotation located at the center of X-Y horizontal and vertical coordinate axes, and b. media guide means located adjacent to a surface of said heated fuser roller and operative to receive media between one surface thereof and said heated fuser roller for changing the direction of media travel by approximately 90° and directing said media in a substantially horizontal direction of travel to an output tray of said printer housing.

4. The apparatus defined in claim 3 which further includes a deflection baffle located adjacent the media exit path from said fuser roller and a heater lamp located at the axis of rotation of said fuser roller.

5. The apparatus defined in claim 3 wherein said media guide means includes a pressure roller and a curved deflection plate located on one side of said media adjacent to the surface of said heated fuser roller for first fusing images onto said media and thereafter guiding said media along an approximately 90° path around approximately one-quarter of the surface area of said heated fuser roller.

6. The apparatus defined in claim 5 which further includes a deflection baffle located adjacent the media exit path from said fuser roller and a heater lamp located at the axis of rotation of said fuser roller.

7. The apparatus defined in claim 3 wherein said media guide means includes a first idler pressure roller located at approximately the three o'clock position on the circumference of said fuser roller and a second idler pressure roller located at approximately the twelve o'clock position on the circumference of said fuser roller.

8. The apparatus defined in claim 7 which further includes a deflection baffle located adjacent the media exit path from said fuser roller and a heater lamp located at the axis of rotation of said fuser roller.

* * * * *